UNITED STATES PATENT OFFICE.

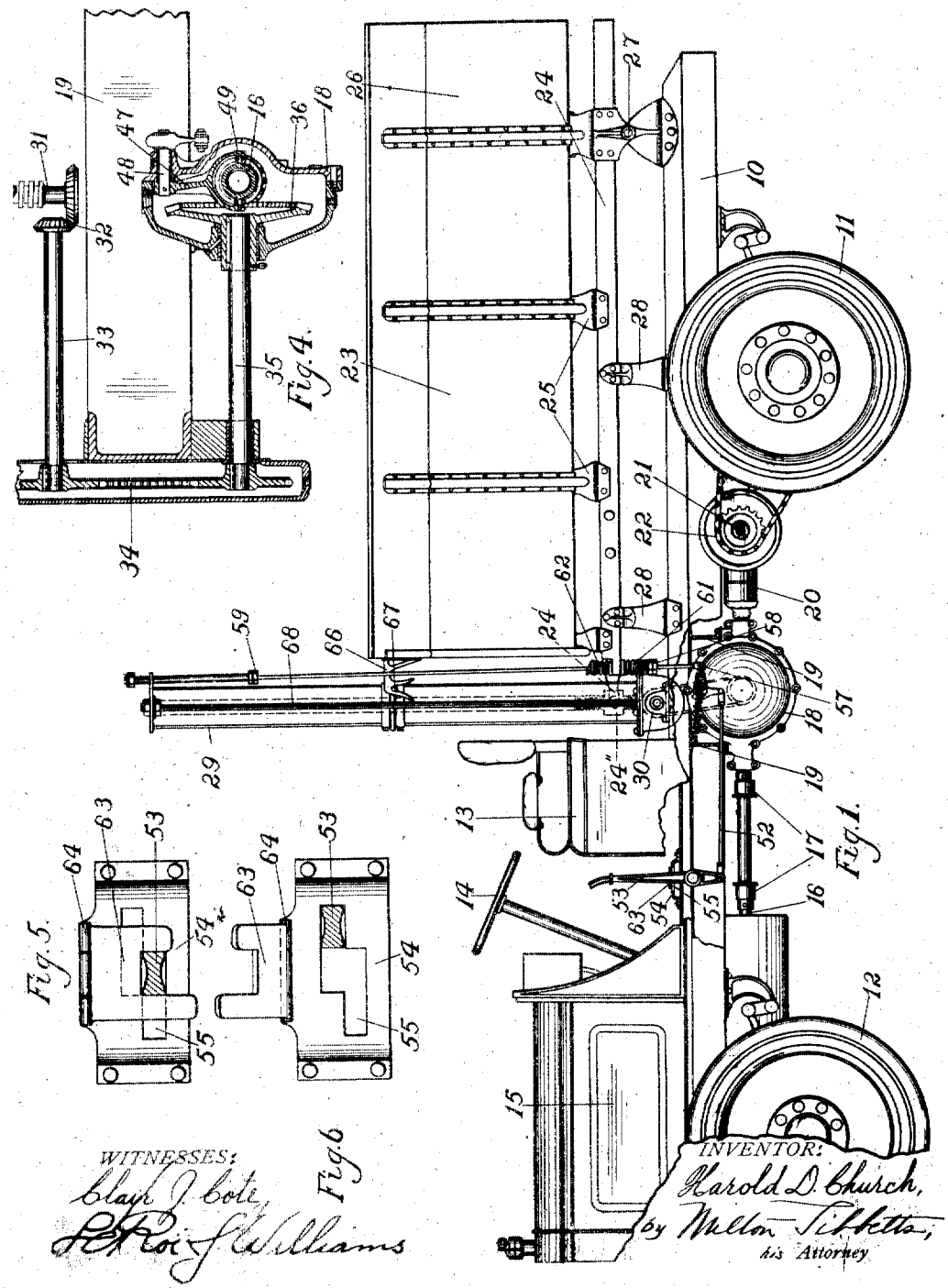

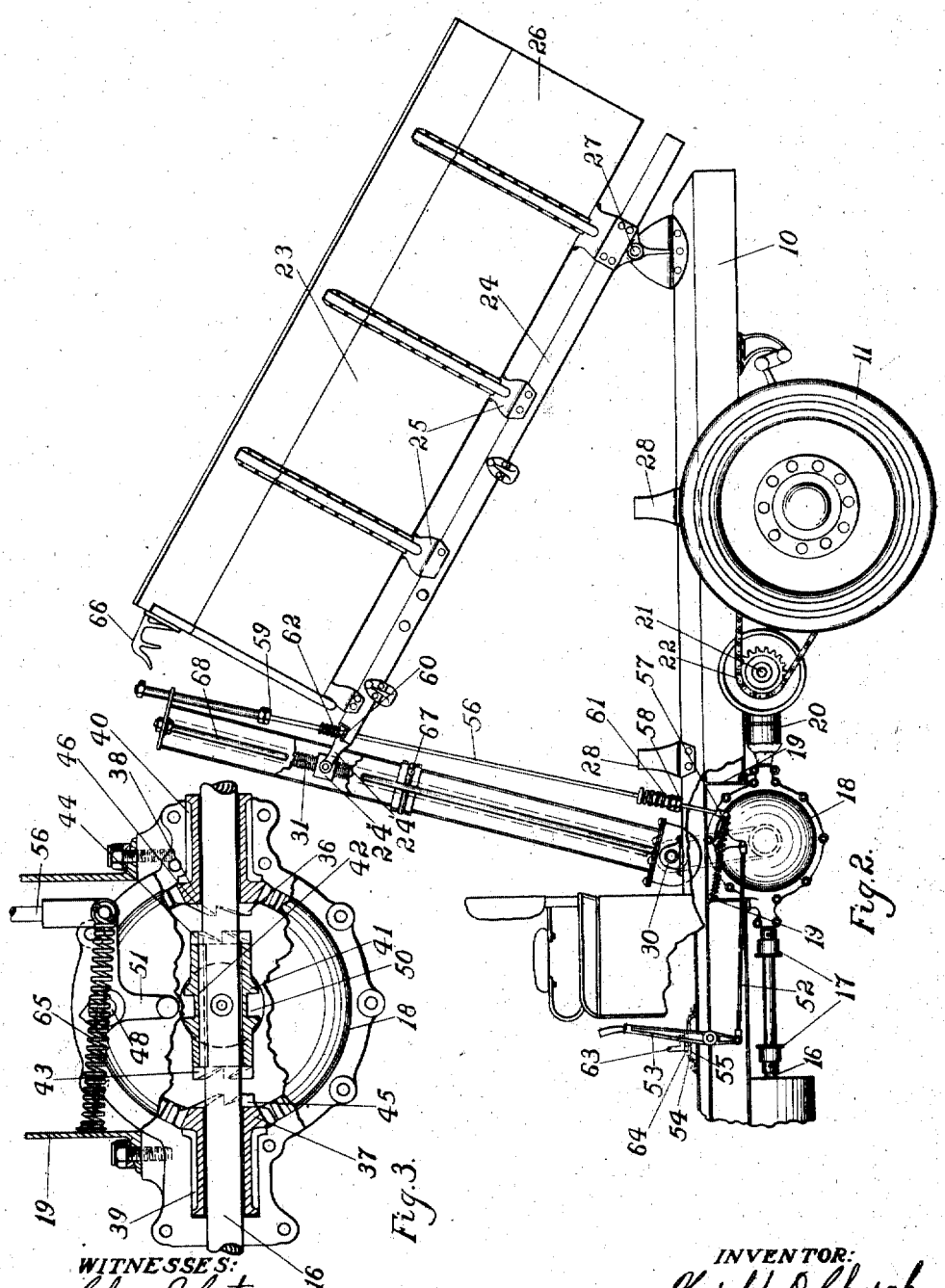

HAROLD D. CHURCH, OF DETROIT, MICHIGAN, ASSIGNOR TO PACKARD MOTOR CAR COMPANY, OF DETROIT, MICHIGAN, A CORPORATION OF MICHIGAN.

MOTOR-VEHICLE.

1,278,855.   Specification of Letters Patent.   Patented Sept. 17, 1918.

Application filed March 10, 1913. Serial No. 753,349.

*To all whom it may concern:*

Be it known that I, HAROLD D. CHURCH, a citizen of the United States, and resident of Detroit, Wayne county, State of Michigan, have invented certain new and useful Improvements in Motor-Vehicles, of which the following is a specification.

This invention relates to motor vehicles, and particularly to commercial vehicles or trucks employing dumping or tilting bodies.

The invention is shown as applied to a vehicle having a motor at the front end thereof, and a driving shaft extending from the motor longitudinally of the vehicle and connected through suitable gearing with the rear driving wheels. A dumping body is mounted on the frame of the vehicle and a suitable mechanism is employed for moving the body to dumping and non-dumping positions. Means are provided between the said motor driving shaft and the said mechanism whereby the mechanism is operated in either of two directions as will be later more fully described. A hand control and an automatic control device are provided.

The salient object of the invention is to provide a simple and easily manufactured gearing to connect the motor driving shaft and the body dumping mechanism in the manner above set forth.

Another object of the invention is to provide a simple and suitable control device for such gearing whereby the operation may be controlled both by hand and automatically. Means are also provided for locking the hand control device in its neutral position.

Other objects of the invention will appear from the following description, taken in connection with the drawings, which form a part of this specification, and in which:

Figure 1 is a side elevation of a motor vehicle embodying this invention;

Fig. 2 is a view similar to Fig. 1, showing the body near its maximum dumping position;

Fig. 3 is a longitudinal sectional view through the motor driving shaft showing the gearing and clutches used to connect said shaft with the dumping mechanism;

Fig. 4 is a transverse sectional view through the gearing and connections between the motor driving shaft and the dumping mechanism; and Figs. 5 and 6 are plan views of the segment in which the hand lever operates and showing the locking device for the lever.

Referring to the drawings, 10 represents the vehicle frame mounted upon the rear driving wheels 11 and the front wheels 12, 13 is the operator's seat; 14 is the steering wheel and 15 is the housing at the front end of the vehicle containing the motor, the driving shaft of which extends rearwardly from the housing, as shown at 16. The shaft 16 extends rearwardly through universal joints 17 and through a casing 18 that is supported upon cross members 19 of the vehicle frame, to a casing 20 in which are suitable bevel gears for driving the jack-shaft 21. The jack-shaft 21 is connected through suitable chain and sprocket 22 with the rear wheels, as is well known.

Any suitable type of body may be employed upon the chassis hereinbefore described and in the present instance the body 23 is shown as of the box type having a base frame-work 24, cross members 25 and suitable side panels 26. The base 24 is pivotally mounted upon the frame 10 at 27 and the forward part of the frame-work rests upon supports 28 which are suitably secured upon the frame 10, as shown in the drawings.

Thus it will be seen that by raising the front end of the body 23 its bottom will be inclined and its contents dumped, the body being shown in nearly its maximum dumping position in Fig. 2. Mechanism for raising and lowering the front end of the body will presently be described.

A tubular housing 29 is mounted on a pivotal support 30 on the frame 10 in an upright position, as shown in Figs. 1 and 2. When the body is in its normal position, as shown in Fig. 1, the casing 29 is preferably in a substantially vertical position, and it is slightly inclined as shown in Fig. 2, when the body is in dumping position.

The housing 29 is formed with a longitudinal slot on its side next to the body and through this slot extends a bracket 24' upon which is pivotally mounted a threaded block or nut 24'' arranged on a screw or worm 31 which extends practically the whole length of the housing. This screw is rotated in either direction through bevel gears 32, shaft 33 and sprocket and chain gearing 34 by a shaft 35, this latter mechanism being shown particularly in Fig. 4. One end of the shaft 35 extends to a position adjacent the driving shaft 16 of the motor and is at right angles thereto. It is provided with a bevel gear 36 which is arranged within the housing 18 hereinabove referred to, and the gear 36 is in constant mesh with a pair of opposed bevel pinions 37 and 38, which are arranged loosely upon the shaft 16, this latter arrangement being best shown in Fig. 3. The shaft 16 in fact has its whole bearing in the casing 18 through these pinions 37 and 38, the latter being mounted in bearings 39 and 40 respectively in said casing 18.

Also mounted upon the section of the shaft 16, which extends through the casing 18, is a double clutch member 41 which is keyed to the shaft 16 as by a key 42 and which is provided with clutch teeth 43 and 44 on its respective ends. The member 41 is adapted to be moved longitudinally on the shaft 16 to positions in contact with either the pinion 37 or the pinion 38. The pinion 37 is formed with clutch teeth 45 which coöperate with the clutch teeth 43, and the pinion 38 is formed with clutch teeth 46 which coöperate with the clutch teeth 44.

A rocking yoke 47 is pivotally mounted within the casing 18, as at 48, and is provided with fingers 49 which operate in an annular groove 50 in the member 41, thus providing means for moving the member 41 while the shaft 16 is in motion, so that it may be in clutching engagement with either the pinion 37 or the pinion 38. A bell crank lever 51 is secured upon the pivot pin 48 on the outside of the casing 18 and is adapted to be controlled by the operator through a rod 52 and a hand control lever 53 to which the rod is connected. This lever 53 is mounted conveniently to the operator's seat 13 and extends through a plate 54 in a slot 55 therein. The slot 55 is in two parts, as shown particularly in Figs. 5 and 6, and the parts are offset from each other so that the lever 53 may be moved into one extremity of the slot, as shown in Fig. 6, and in order to move it to the other extremity of the slot it must be rocked laterally at the center of the slot. As the center of the slot is the neutral position of the lever, it will be seen that when the lever is in one of the extreme positions it will strike against the wall at the offset portion of the slot if it is suddenly moved toward the other extreme position. Thus the operator is prevented from going quickly from one extreme position to the other, so that the rotating parts will have a better opportunity to come to rest and the machinery subjected to less jar than if the operator were free to move the lever 53 quickly from forward position to reverse, or vice versa.

A control rod 56 is suitably supported by the housing 29 and arranged longitudinally thereof in a position adjacent the forward end of the body 23 and is connected to one of the arms of the bell crank lever 51, as at 57. The rod 56 is provided with stops 58 and 59 adjacent its respective ends, and a part 60 of the forward end of the body 23 is adapted to travel adjacent the rod 56 as the body is moved to dumping and non-dumping positions and to contact with the stops 58 and 59 respectively and thereby move the rod 56 with the body toward the end of its normal travel. As shown, spring buffers 61 and 62 are used to give a quick movement to the rod 56. It will be seen that as the spring device 62 comes in contact with the stop 59 the spring will be compressed somewhat before the rod 56 will be moved with the body, by reason of the friction that must be overcome, but when the rod does start to move, the spring will tend to accelerate its movement, and the bell crank lever 51 will consequently be rocked quickly and the clutch member 41 will be quickly withdrawn from its clutching engagement with one of the pinions 37 or 38. In this movement, the lever 53 will also be moved from the extreme position in which it was placed by the operator and it will strike against the wall of the offset portion of the slot 55 and thereby stop the further movement of the member 41. The lever 53 may then be locked in its central or neutral position, as shown in 55, by a latch 63 which is hinged, as at 64, to the plate 54. The latch is shown in its locking position in Fig. 5 and in its unlocked position in Fig. 6.

A spring 65 is shown in Figs. 1, 2 and 3 as connected to the pivot 57 and one of the cross frame members 19. This spring is adapted to maintain the clutching member 41 yieldingly in clutching engagement with either of the pinions 37 or 38 and it is shown as being slightly above the line of the pivot pin 48 so that it will act to balance to some extent the weight of the rod 56. Were it not for this balancing effect, the weight of the rod 56 would always tend to throw the clutching member 41 into engagement with the pinion 37.

A bracket 66 is preferably secured to the front end of the body 23 to coöperate with a pin 67 on the housing 29 for the purpose of connecting the body and the housing when the former is in its normal or non-dumping position, as shown in Fig. 1. The housing may also be strengthened or braced as by longitudinal brace rods 68.

It will be understood that the motor is provided with the usual friction clutch between its crank-shaft and the driven shaft 16 hereinabove described, which clutch may be disengaged by the operator for the purpose of permitting the shaft 16 to be connected through gears with the vehicle driving mechanism, or with the dumping mechanism, hereinabove described.

The operation of the mechanism may be described as follows:

With the parts in the position shown in Fig. 1, that is, with the body at rest in its normal or non-dumping position, and the motor running idle, the motor clutch is disengaged by the operator, which permits the shaft 16 to stop. The operator then moves the lever 53 rearwardly into its extreme position in the slot 55, which movement, through the rod 52 and bell crank 51, rocks the yoke 47 which slides the member 41 so that its clutch teeth 43 engage the teeth 45 on the pinion 37. This connection having been completed the motor clutch is allowed to engage, which causes the shaft 16 to rotate and carry with it the pinion 38 and consequently the bevel gear 36. Thence through the intermediate shaft 35, the sprocket gearing 34, the shaft 33 and the gearing 32 the screw or worm 31 is rotated and the block 24″ is raised and with it the front end of the body. Thus the body is raised to the dumping position shown in Fig. 2. As the part 60 on the front end of the frame 24 approaches the step 59 on the rod 56 the spring 62 is compressed and as soon as the friction and the tension of the spring 65 are overcome the rod 56 is suddenly moved upwardly thereby rocking the yoke 47 and withdrawing the clutch member 41 from engagement with the pinion 37. This movement of the rod 56 will bring the hand lever 53 to its central neutral position. The operator may then return the body to its normal or non-dumping position by reversing the position of the lever 53 and thereby reversing the position of the clutch member 41 so that the screw 31 is revolved in the opposite direction. This brings the block 24″, and consequently the front end of the body, down to a position of rest on the supports 28, the clutch member being disengaged and moved to neutral position by the part 60 operating the rod 56 through the spring 61 and stop 58.

A specific embodiment of the invention has been described in detail and will be specifically claimed, but it will be understood that the invention is not limited to the exact details of construction shown, as it will be apparent that changes may be made without departing from the spirit or scope of the invention.

Having thus described my invention, what I claim and desire to secure by Letters Patent is:

1. In a motor vehicle, the combination with the frame, the motor, a dumping body mounted on the frame, and mechanism for moving said body to dumping and non-dumping positions, of a shaft driven by the motor, means connecting said shaft with said mechanism and including a double clutch member, a hand lever for throwing said clutch into either of its engaging positions, a rod having spring stops also connected to operate said clutch, a device on the body coöperating with said stops to withdraw the clutch from either of its engaging positions, and means for stopping said clutch in intermediate position.

2. In a body dumping mechanism, the combination with a double clutch member adapted to operate said mechanism in either of two directions, an upright rod for throwing said clutch, and a spring tending to balance the weight of said rod, of a device on the body coöperating with said rod for throwing the clutch.

3. In a body dumping mechanism, the combination with a double clutch member adapted to operate said mechanism in either of two directions, of a hand lever connected to operate said clutch, a guide for said lever having offset interconnected slots in which said lever may move, and a spring device tending to move said lever toward either of its two extreme positions.

4. In a dumping body mechanism, the combination with a double clutch member adapted to operate said mechanism in either of two directions, of a hand lever connected to operate said clutch, a guide for said lever having offset interconnected slots in which said lever may move, a spring device tending to move said lever toward either of its two extreme positions, and a lock to hold said lever in neutral position.

In testimony whereof I affix my signature in the presence of two witnesses.

HAROLD D. CHURCH.

Witnesses:
CLAIR J. COTE,
LE ROI J. WILLIAMS.